(12) United States Patent
Tripodi et al.

(10) Patent No.: US 6,951,615 B2
(45) Date of Patent: Oct. 4, 2005

(54) GREASE REMOVAL SYSTEM

(75) Inventors: Joseph Tripodi, Erie, PA (US); Carl R. Nicolia, Erie, PA (US); Douglas R. Wroblewski, Wattsburg, PA (US); Robert J. Burnham, Conneautville, PA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

(21) Appl. No.: 10/809,188

(22) Filed: Mar. 25, 2004

(65) Prior Publication Data

US 2004/0195186 A1 Oct. 7, 2004

Related U.S. Application Data

(60) Provisional application No. 60/500,399, filed on Sep. 5, 2003, provisional application No. 60/464,489, filed on Apr. 22, 2003, and provisional application No. 60/457,206, filed on Mar. 25, 2003.

(51) Int. Cl.[7] .................................................. C02F 1/40
(52) U.S. Cl. .......................... 210/744; 210/800; 210/804; 210/805; 210/85; 210/97; 210/187; 210/299; 210/320; 210/521; 210/540
(58) Field of Search .................................. 210/606, 632, 210/744, 800, 804, 805, 85, 97, 187, 195.1, 205, 299, 320, 521, 540

(56) References Cited

U.S. PATENT DOCUMENTS

| 3,617,538 | A | | 11/1971 | Bogert |
| 4,113,617 | A | * | 9/1978 | Bereskin et al. ............ 210/742 |
| 4,472,277 | A | | 9/1984 | Bailey et al. |
| 4,940,539 | A | * | 7/1990 | Weber ........................ 210/149 |
| 5,225,083 | A | | 7/1993 | Pappas et al. |
| 5,254,253 | A | | 10/1993 | Behmann |
| 5,342,523 | A | | 8/1994 | Kuwashima |
| 5,433,846 | A | | 7/1995 | Roshanravan |
| 5,458,778 | A | | 10/1995 | Stuckmann et al. |
| 5,505,860 | A | * | 4/1996 | Sager ......................... 210/519 |
| 5,705,055 | A | * | 1/1998 | Holloway et al. .......... 210/115 |
| 5,993,646 | A | * | 11/1999 | Powers ........................ 210/86 |
| 6,187,193 | B1 | | 2/2001 | Ozama |
| 6,315,903 | B1 | | 11/2001 | Noyes |
| 6,423,213 | B1 | * | 7/2002 | Mazurek ..................... 210/115 |

* cited by examiner

*Primary Examiner*—Betsey Morrison Hoey
(74) *Attorney, Agent, or Firm*—Webb Ziesenheim Logsdon Orkin & Hanson, P.C.

(57) ABSTRACT

A grease removal system includes a solid interceptor fluidly coupled to a grease trap tank, which is fluidly coupled to a secondary tank. The secondary tank contains an enzyme solution which biodegrades the grease. The grease removal system may also include a solid interceptor fluidly coupled to a grease trap tank which is fluidly coupled to a replaceable container. Grease is diverted from the grease trap tank into the replaceable container and thereafter discarded. The grease removal system may include a grease trap tank utilizing a unique arrangement of grease baffles and solids baffles which work together to isolate grease within a single region of the grease trap tank for ease of disposal. Finally, the grease removal system includes two level sensors which detect the level of grease within the grease trap tank and, at the appropriate level direct the accumulated grease from the grease trap tank.

55 Claims, 12 Drawing Sheets

US 6,951,615 B2

GREASE REMOVAL SYSTEM

CROSS REFERENCE TO RELATED APPLICATIONS

This application claims the benefit of U.S. Provisional Application No. 60/464,489, filed Apr. 22, 2003, U.S. Provisional Application No. 60/457,206, filed Mar. 25, 2003, and U.S. Provisional Application No. 60/500,399, filed Sep. 5, 2003, which are incorporated by reference in their entirety.

BACKGROUND OF THE INVENTION

1. Field of the Invention

The present invention relates to the treatment of wastewater products and, more particularly, to a grease trap design for minimizing the disposal of grease, fats and oils from wastewater.

2. Description of Related Art

Grease traps are typically located in restaurants, meat and poultry processing plants, slaughter houses and other industries having excessive amounts of greasy wastewater and foreign materials, such as insoluable solids, that must be treated to prevent the discharge into sanitary sewer systems. The overtaxing of municipal sewage treatment facilities has become a serious problem in many communities and ordinances requiring a reduction in volume of grease and insoluble solids discharged into municipal sewers are becoming more widespread and stringent.

When greasy wastewater is discharged through a wastewater disposal system, the grease accumulates on the interior walls of associated piping. As the grease coating grows, it obstructs the flow of wastewater in the sewage pipe. Grease traps are typically utilized to intercept and remove this grease prior to entrance into the disposal system. In many instances, grease traps are not properly cleaned or maintained which may result in inadequate removal of grease.

In an effort to improve the separation and collection of grease and foreign materials, grease traps may have a series of compartments. However, these compartmentalized grease traps typically utilize removable screens, level and temperature sensors, valves and heating devices to properly maintain the flow and separation of grease from the wastewater. Grease traps of this type require frequent cleaning to remove accumulated materials. Cleaning of these grease traps is an unpleasant task that can become very messy and tedious. However, if the grease trap is not properly maintained, the grease will collect on the sensors and valves, thereby causing the grease trap to function improperly. Therefore, there is a need for a simple grease trap that minimizes the above-mentioned deficiencies due to improper cleaning and maintenance.

Grease traps are well known in the art for receiving and processing a mixture of water and grease. The water and grease mixture is introduced within the grease trap tank where a baffle obstructs the flow of the water and grease mixture causing the grease and water mixture to slow down in velocity. The grease trap includes a settling chamber, whereby the grease floats on top of the water and the water is removed from the bottom of the grease trap. In each grease trap design, a portion of the grease, or the solids, however small, will end up passing through the grease trap. Therefore, it is an object of the present invention to lower the amount of grease and/or solids that pass through the grease trap.

SUMMARY OF THE INVENTION

In one embodiment a grease removal system has a grease trap tank with outer walls and a bottom connected to the outer walls. An inlet extends through an outer wall of the grease trap tank, wherein the inlet has a center and a lower end. An outlet extends through an outer wall of the grease trap tank, wherein the outlet has a center and a lower end. An outlet grease baffle is positioned between the inlet and the outlet and extends downwardly across the tank to an elevation spaced from the tank bottom defining a passageway therethrough to permit effluent having a specific gravity greater than grease to pass but to retain and accumulate grease on the surface of the effluent within the grease trap tank. The outlet grease baffle defines a grease chamber within the tank between the inlet and the outlet grease baffle. A discharge portal having a center and a lower end extends through the grease trap tank outer wall in the grease chamber to the outside of the grease trap tank, wherein the lower end of the discharge portal is above the lower end of both the inlet and outlet to permit removal of liquid grease from the surface of the effluent passing through the grease trap.

In another embodiment, a method of removing grease from an effluent comprises the steps of providing a grease trap tank having outer walls and a bottom connected to the outer walls, an inlet through an outer wall of the grease trap tank, wherein the inlet has a center and a lower end, and an outlet through an outer wall of the grease trap tank, wherein the outlet has a center and a lower end. Effluent laden with grease is introduced into the grease trap. A substantial portion of the grease is separated from the effluent by allowing the grease to float upon the other effluent. Grease that rests upon and above the other effluent is discharged by allowing the grease to flow from the tank at a certain level. The discharged grease is then directed through a discharge portal and out of the grease trap tank.

Another embodiment of the subject invention is directed to a grease removal system for removing grease having a grease trap tank wherein grease is accumulated upon the surface of other effluent within the tank. A discharge portal extends from the grease trap tank at a certain level on the tank to extract the accumulated grease. A replaceable container is used for collecting the grease extracted from the grease trap tank, wherein the replaceable container has an inlet. A quick connect coupling exists between the discharge portal and the replaceable container inlet for ease in removal or installation of the discharge portal with the replaceable container.

In yet another embodiment, a grease removal system has a grease trap tank having outer walls and a bottom connected to the outer walls. An inlet extends through an outer wall of the grease trap tank, wherein the inlet has a center and a lower end. An outlet extends through an outer wall of the grease trap tank, wherein the outlet has a center and a lower end. An outlet grease baffle is positioned between the inlet and the outlet and extends downwardly across the tank to an elevation spaced from the tank bottom to permit effluent having a specific gravity greater than grease to pass but to retain and accumulate grease on the surface of the other effluent within the grease trap tank. The outlet grease baffle defines a grease chamber within the tank between the inlet and the outlet grease baffle. A discharge portal has a center and a lower end and extends through the grease trap tank outer wall in the grease chamber to the outside of the grease trap. The lower end of the discharge portal is below the lower end of both the inlet and outlet to permit removal of liquid grease from the surface of the effluent passing through the grease trap, wherein the discharge portal has a valve therein. A first level sensor is positioned below the discharge portal, wherein the first level sensor is capable of sensing a layer of grease upon the effluent, such that when such a layer is detected, the valve in the discharge portal is opened and grease is removed from the grease trap tank until the first level sensor no longer detects a layer of grease.

Yet another embodiment is directed to a method of removing grease from an effluent comprising the steps of providing a grease trap tank having outer walls and a bottom connected to the outer walls, an inlet through an outer wall of the grease trap tank, wherein the inlet has a center and a lower end, and an outlet through an outer wall of the grease trap tank, wherein the outlet has a center and a lower end. Effluent laden with grease is then introduced into the grease trap. A substantial portion of the grease is separated from the other effluent by allowing the grease to float upon the other effluent. Grease is allowed to accumulate to a predetermined thickness thereby weighing upon the other effluent in the grease trap tank and depressing the level of the other effluent within the tank. When the grease layer reaches a predetermined level, a valve is opened and an extraction pump is activated to discharge the grease until the grease is removed to below a predetermined level.

DETAILED DESCRIPTION OF THE INVENTION

Figure 1:
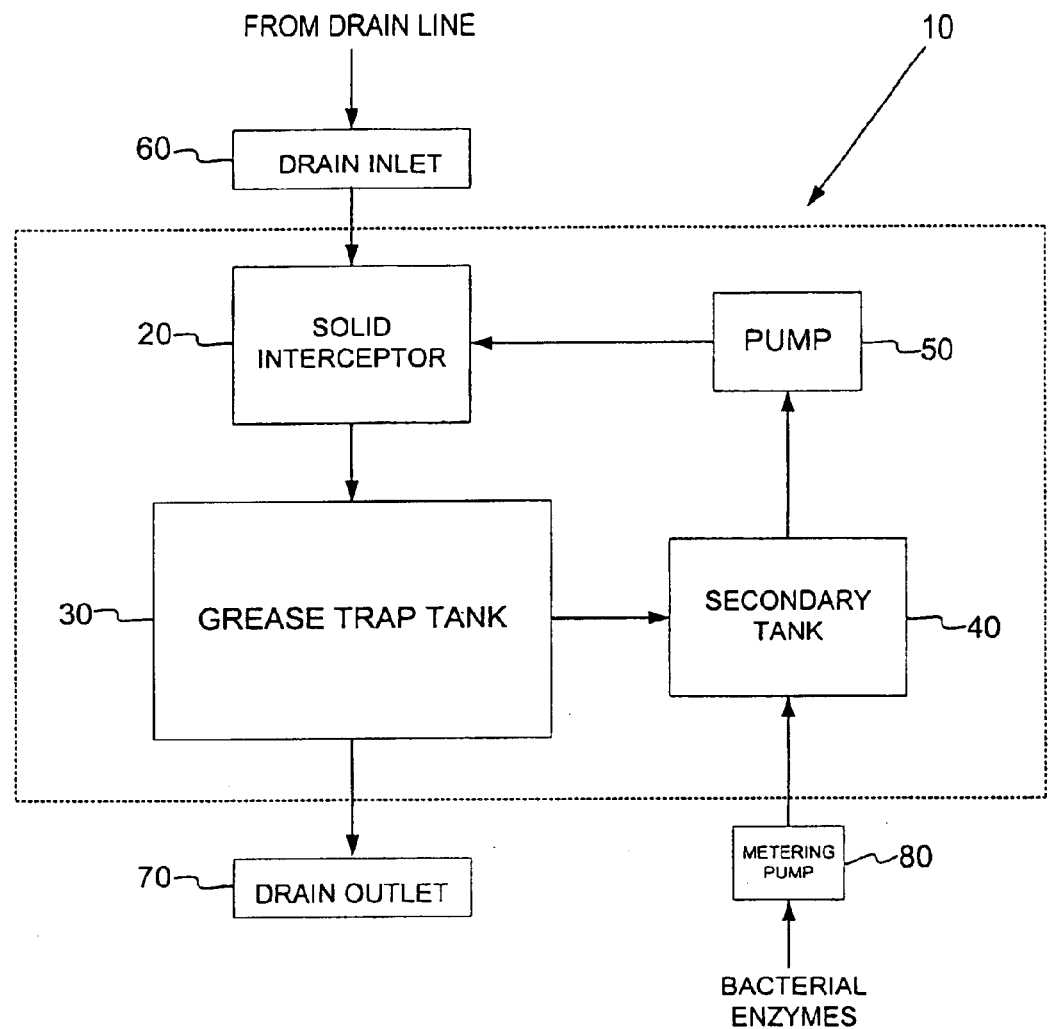
FIG. 1 is a block diagram of one embodiment of the grease removal system made in accordance with the subject invention.

FIG. 1 shows a block diagram of a grease removal system 10 in accordance with the present invention. The grease removal system 10 is typically placed in line with a wastewater drain line such as in a drain line of a sink. Referring to FIG. 1, the grease removal system 10 includes a solid interceptor 20, a grease trap tank 30, a secondary tank 40, and a secondary tank pump 50. A drain inlet 60 may be fluidly coupled to the solid interceptor 20 for allowing wastewater to enter into the solid interceptor 20, wherein extraneous solid waste materials, such as food particles, plastic cups, straws, bits of paper, and other solid waste may be removed from the wastewater. The solid interceptor 20 may include a screen filter or bag that traps particles above a certain size. The wastewater from the solid interceptor 20 enters the grease trap tank 30 and the grease is separated from the wastewater. The grease trap tank 30 functions as a hold-up tank, wherein gravity is used to separate the grease from the water. Because grease has a lower specific gravity than water, grease floats to the surface of the wastewater in the grease trap tank 30, thus forming a grease layer. The water under the grease layer flows out of a drain outlet 70. Grease separated from the water is directed to the secondary tank 40. Bacterial enzymes that are designed to bio-digest the grease are introduced into the secondary tank 40 through a metering pump 80. These enzymes break down the waste grease, thereby also reducing the total solids in the wastewater and substantially reducing the biochemical oxygen demand (BOD) level. Broken down grease becomes carbon dioxide and water. Fluid from the secondary tank 40 is transferred to the solid interceptor 20. The pump 50 is used to transport the broken down residual fluid and any other remaining residual matter from the secondary tank 40 into the solid interceptor 20, wherein any untreated grease is recirculated back through the grease trap tank 30. When the grease is properly treated, the residual fluid will not float to the top of the grease trap tank 30, but the untreated grease and/or grease-like material will float to the top of the grease trap tank 30. Therefore, the residual fluid, which is now no longer grease, will flow out of the drain outlet 70.

Figure 2:
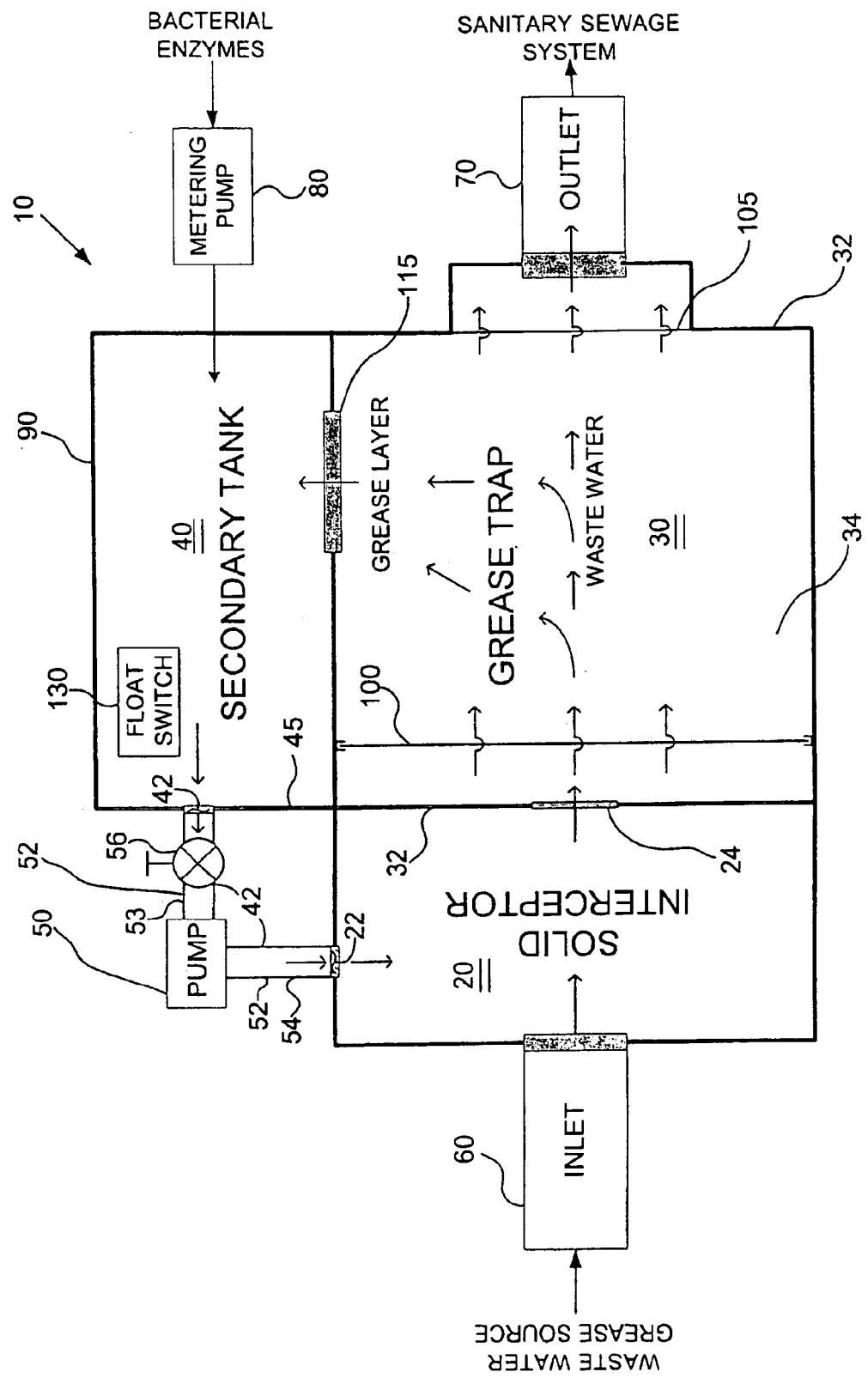
FIG. 2 is a schematic of the grease trap design shown in FIG. 1 depicting the flow of the grease trap wastewater.
Figure 3:
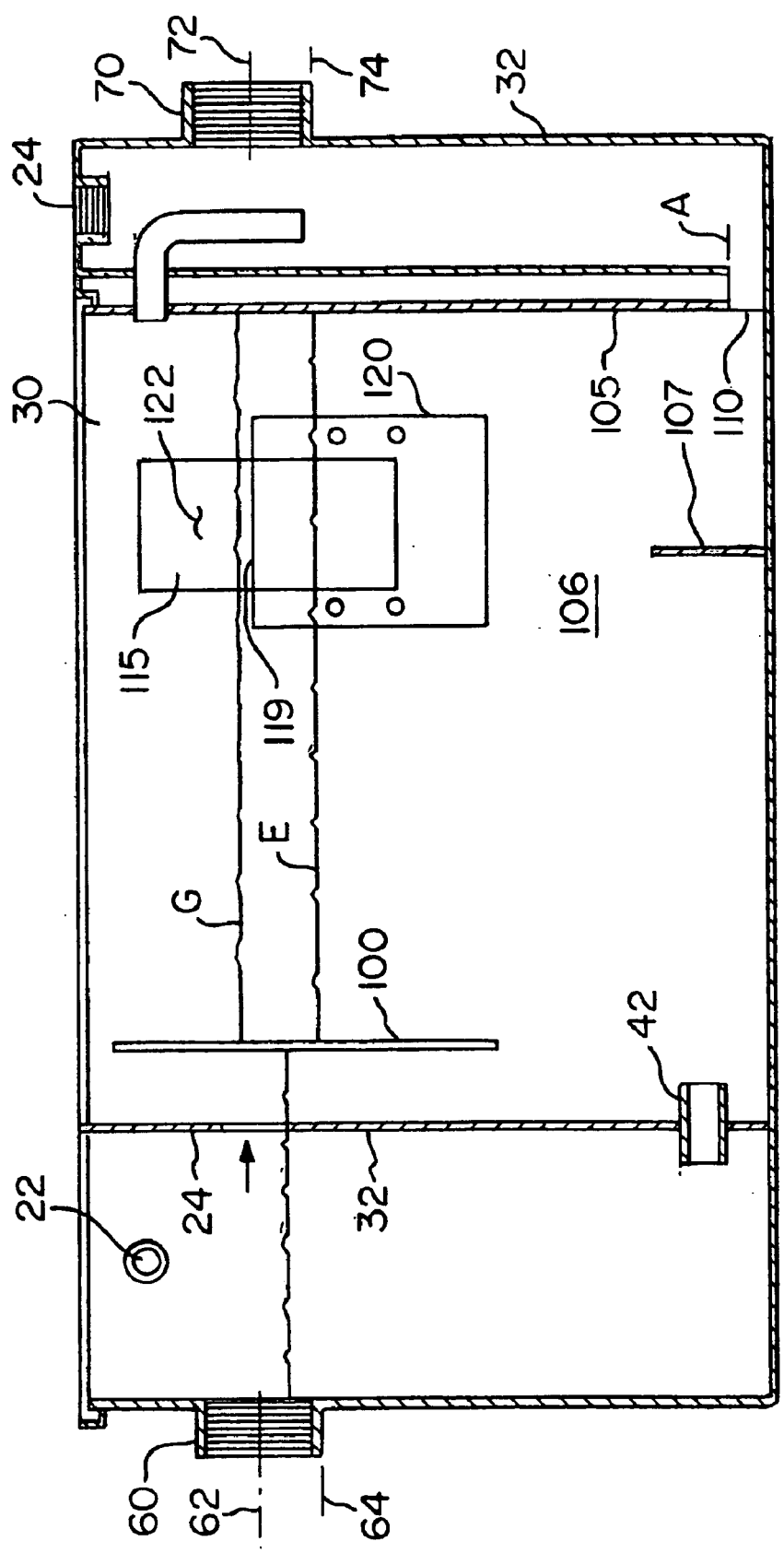
FIG. 3 is an elevational side view of a section of the housing shown in FIG. 2.

The discussion directed to the schematic illustrated in FIG. 1 applies equally to the top view of the grease removal system illustrated in FIG. 2 and will be further expanded with details illustrated in both FIG. 2 and FIG. 3, which is a side elevational view of one embodiment of the grease removal system.

FIG. 2 shows the solid interceptor 20, grease trap tank 30, secondary tank 40 and pump 50 all enclosed within a housing 90. While the housing 90 may have a single lid covering its entire open top, the housing 90 may also have a plurality of lids for enclosing the open top of different portions of the housing 90. The housing 90 and any lids may be made of metal, such as steel or cast iron, or a polymeric material such as polyvinylchloride (PVC). However, it should be appreciated that the drain inlet 60, solid interceptor 20, grease trap 30, secondary tank 40, pump 50 and drain outlet 70 are all in fluid communication and are all sealed such that the wastewater is contained therein without breaching such containment.

Directing attention to FIGS. 2 and 3, the grease trap tank 30 has walls 32 and a bottom 34 connected to the walls 32. The drain inlet 60 is in fluid communication with the grease trap tank 30 through the wall 32, wherein the drain inlet 60 has a center 62 and a lower end 64. The drain outlet 70 is in fluid communication with an opposing outer wall 32 and, furthermore, has a center 72 and a lower end 74. An entrance baffle 100 extends across the width of the grease trap tank 30 such that fluid entering through the drain inlet 60 is directed against the entrance baffle 100 and, upon impact with the entrance baffle 100, loses its horizontal velocity component wherein it is thereafter directed downwardly toward the bottom 34 of the grease trap tank 30 where it resides within the grease trap tank 30. Once the wastewater travels under the entrance baffle 100, the grease in the relatively still wastewater has an opportunity to float to the top surface, thereby forming a grease layer. It should be appreciated that during operation of the grease removal system, the level of wastewater within the grease trap will not be lower than the lower end 64 of the drain inlet 60 or the lower end 74 of the drain outlet 70. The entrance baffle 100 is removable to purge any grease that may accumulate on the surface of the wastewater between the wall 32 at the solid interceptor outlet 24 and the entrance baffle 100.

An outlet grease baffle 105 is positioned between the drain inlet 60 and the drain outlet 70 and extends downwardly in the tank 30 to an elevation A spaced from the tank bottom 34 defining a passageway 110 therethrough to permit effluent having a specific gravity greater than grease to pass while retaining and accumulating grease on the surface of the effluent within the grease trap tank 30. The outlet grease baffle 105 defines a grease chamber 106 within the grease trap tank 30 between the drain inlet 60 and the outlet grease baffle 105. A first solids baffle 107 prevents any solid waste that may have passed through the solid interceptor 20 from being washed through the passageway 110 to the drain outlet 70. It should be appreciated that, as illustrated in FIG. 2, the grease outlet baffle 105 is aligned with the wall 32 of the grease trap tank 30. However, it is entirely possible for the grease outlet baffle 105 to be located on either side of the locations illustrated in FIG. 2. As an example, the grease outlet baffle 105 may be spaced from the wall 32 in the direction of the outlet grease baffle 107.

Discharge portal 115 has a lower end 119 which extends through the grease trap tank wall 32 to the outside of the grease trap tank 30. The lower end 119 of the discharge portal 115 is above the lower ends 64, 74 of the drain inlet 60 and the drain outlet 70 to permit removal of grease from the surface of the effluent passing through the grease trap tank 30. As illustrated in FIG. 3, the level of the wastewater within the grease trap tank 30 is at a particular elevation W as a composite mixture of both effluent and grease. However, once past the entrance baffle 100, when the specific gravity of the grease begins to cause separation, the grease floats upon the effluent and a layer of grease G begins to float on top of the effluent E in the tank 30. As more wastewater passes through the grease trap tank 30, the layer of grease G becomes thicker and thicker until the level exceeds that of the lower end 119 of the discharge portal 115. FIG. 3 has been exaggerated to highlight this difference. At that point, the discharge portal 115 permits removal of the grease G from the surface of the effluent E passing through the grease trap tank 30. In the embodiment illustrated in FIGS. 2 and 3, the discharge portal 115 directs the grease G into the secondary tank 40, wherein the secondary tank 40 retains an enzyme solution which acts upon and decomposes the grease therein. As illustrated in FIG. 3, the discharge portal 115 is comprised of a skim plate 120 which selectively blocks a portion of slot 122 to define the lower end 119 of the discharge portal 115. In essence, in this embodiment, the discharge portal 115 has a spillway such that when grease G accumulates on the effluent E to a sufficient thickness, the grease G will proceed to pass over the spillway into the secondary tank 40. Simultaneously, effluent E exits the grease trap tank 30 through the passageway 110 at the bottom of the outlet grease baffle 105 and thereafter passes through the drain outlet 70. The lower end 74 of the drain outlet 70 may be at substantially the same level as the lower end 119 of the discharge portal 115. Through this arrangement, the amount of effluent passing through the discharge portal 115 is minimized while the grease G passing through is maximized. The time it takes to fill the secondary tank 40 is dependent upon the amount of grease in the incoming wastewater and the height of the lower end 119 of the discharge portal 115.

Effluent traveling through passageway 110 may still contain residual grease which may be retained in the clean out portion 108 of the grease trap tank 30. A threaded access port 109, sealed with a plug (not shown) provides access to the clean out portion 108 for removing any grease that may accumulate therein.

As illustrated in FIGS. 1–3, the grease trap tank 30, through the discharge portal 115, directs grease removed from the surface of the effluent passing through the grease trap tank 30 into a secondary tank 40, whereupon an enzyme solution acts upon and biodegrades the grease. It should be noted, and will be discussed in an alternate embodiment of the subject invention, that the discharge portal 115 of the grease trap tank 30 may also direct the flow of grease into a removable container such as a grease bag.

Bacterial enzymes can be introduced into the secondary tank 40 continuously through the operation of a metering pump 80 or, alternatively, may be introduced intermittently through a timer associated with the metering pump 80. In either case, the amount of enzymes to be added to the secondary tank 40 is determined by the requirements of the wastewater. Also, in certain installations, the enzymes can be introduced manually, either on a daily basis or at other intervals. Although not illustrated in the Figures, an aerator or agitator can be provided within the secondary tank 40 to promote the dispersion of the enzyme solution with the grease.

Directing attention to FIG. 2, the secondary tank 40 may include a level indicator, such as a mechanical float switch 130 that is in communication with the pump 50. When the float switch 130 reaches a certain level, the pump 50 may turn on for a specified amount of time, thus transporting the broken-down fluid and other residual materials from the secondary tank 40 into the solid interceptor 20 via a conduit such as hose 52. The secondary tank 40 has an outlet 42 (shown in phantom in FIG. 3) defined in the bottom half of a secondary tank wall 45 so that the prior reacted contents in the secondary tank 40 can be emptied from the bottom of the tank 40. FIG. 3 illustrates the location of the outlet 42 relative to the wall 45 of the secondary tank 40.

Additionally, a hose 52 extending from the pump 50 used to transfer effluent from the secondary tank 40 to the solid interceptor 20 connects to the solid interceptor 20 at the re-circulating effluent inlet 22. As illustrated in FIG. 2, a first hose section 53 of the hose 52 is connected to an inlet of the pump 50, while a second hose section 54 of the hose 52 is connected to an outlet of the pump 50 and the re-circulating effluent inlet 22 of the solid interceptor 20. A valve 56 may optionally be placed in the first hose section 53 of the hose 52. Whenever the pump 50 is removed for servicing, the valve 56 may be closed, thus preventing effluent from breaching the confines of the system. The re-circulating effluent inlet 22 is typically above the wastewater level in the solid interceptor 20, thus eliminating the need for a second valve. The secondary tank pump 50 is positioned to extract fluid from the bottom of the secondary tank 40. This may be achieved with hose 52 extending from the bottom of the secondary tank 40.

Figure 4:
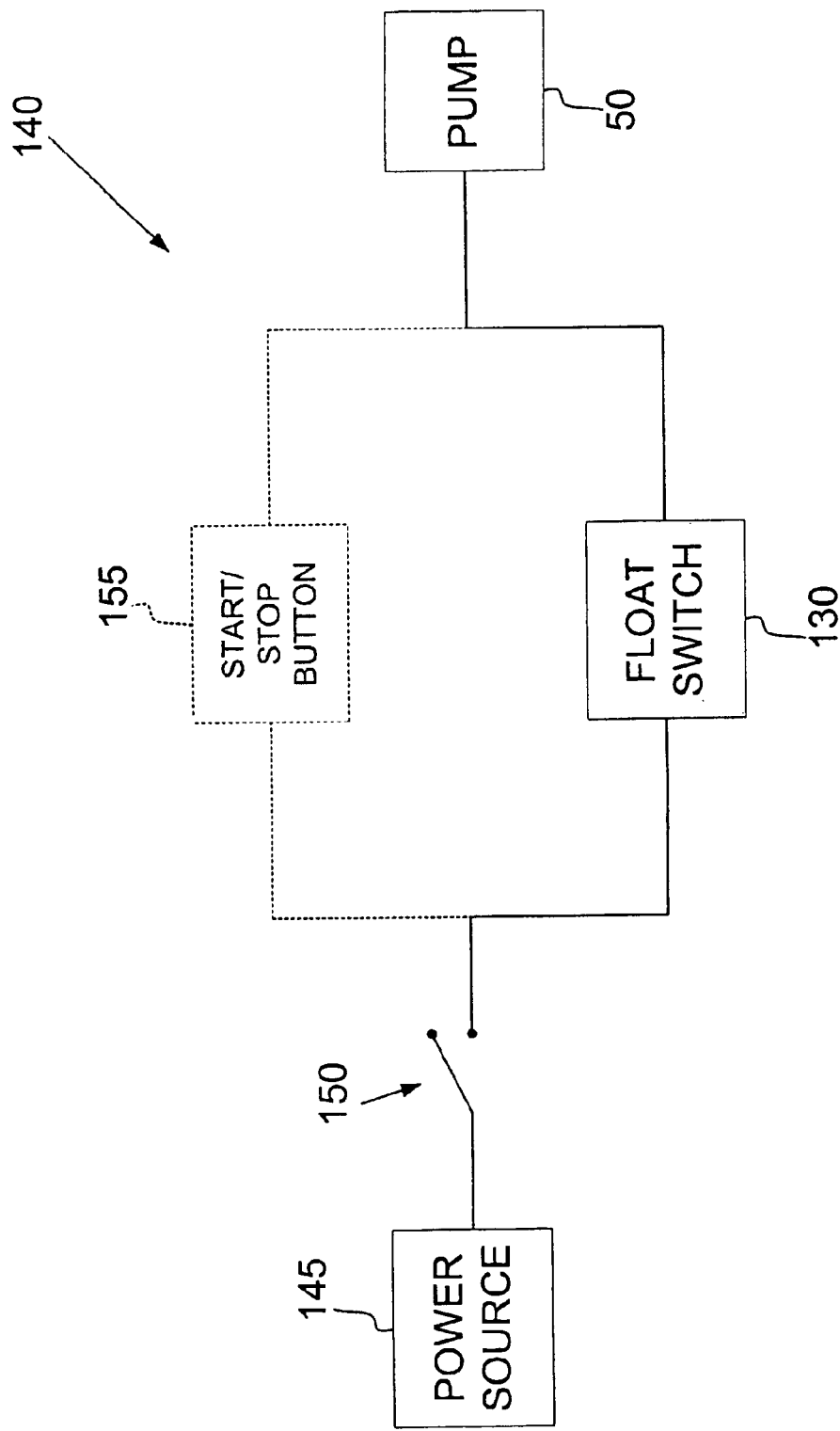
FIG. 4 is a block diagram showing a control scheme of the grease trap design shown in FIG. 1.

Directing attention to FIG. 4, the control scheme 140 includes the mechanical float switch 130, the pump 50, a power source 145, such as an AC outlet, an on/off switch 150, and an optional start/stop button 155 (shown in phantom). When the on/off switch 150 is turned on, power from the power source 145 energizes the control scheme 140 hardware. When the float switch 130 is activated due to a high level in the secondary tank 40, the pump 50 turns on, thus transferring the contents in the secondary tank 40 to the solid interceptor 20. The pump 50 can remain on for a specified amount of time or until the secondary tank 40 is emptied. As an option, the pump 50 could be manually operated by activating the start/stop button 155, thus providing a self-cleaning arrangement. The pump 50 can also remain on for a specified amount of time or can shut down when the start/stop button 155 is activated again. Activation of the start/stop button 155 bypasses activation of the pump 50 by the float switch 130 and provides a self-cleaning cycle by transferring the contents in the secondary tank 40 to the solid interceptor 20. "Self-cleaning" is meant to define a condition, wherein a person does not need to physically clean the grease trap tank 30 and associated components by hand.

To assist in the self-cleaning of the grease trap tank 30, hot water, such as that from the hot water tap of a sink faucet, may be added to the grease trap tank 30. Whenever the pump 50 is activated, the operator/user may allow the hot water to enter the solid interceptor 20 through the drain inlet 60 to aid in cleaning. The hot water raises the temperature and fluid level of the wastewater in the grease trap 30, thus assisting in melting any solidified grease, and increasing the amount of the grease being removed through the discharge portal 115 into the secondary tank 40.

In operation, wastewater from the grease source enters the solid interceptor 20 through the drain inlet 60 and large solid waste particles are filtered therein. The wastewater then flows through the outlet 24 of the solid interceptor 20 into the grease trap tank 30. The wastewater then is deflected by entrance baffle 100 and forced to travel under the entrance baffle 100, wherein the horizontal velocity of the wastewater is decreased and wherein the grease is separated from the wastewater. As the wastewater flows under the entrance baffle 100, a grease layer G forms on the top surface of the wastewater. The wastewater that does not contain the grease remains underneath this grease layer and flows through passageway 110 to the drain outlet 70. As the grease layer reaches a certain height, it overflows through the discharge portal 115 into the secondary tank 40. Grease-eating bacterial enzymes are pumped into the second tank 40 via the metering pump 80 and decompose the grease. When a certain level is reached in the secondary tank 40, the float switch 130 is activated, which causes the pump 50 to turn on, thus pumping the contents of the secondary tank 40 into the solid interceptor 20, wherein the separation process is repeated. The broken-down fluid passes through the drain outlet 70 and any remaining residual materials from the grease trap tank 30 will be re-circulated back into the secondary tank 40. If the contents of the secondary tank 40 do not reach a certain level to activate the float switch 130, the user may bypass the float switch 130 and turn on the pump 50 by pressing the start/stop button 155. When the pump 50 is activated, the user may also manually introduce hot water into the grease trap tank 30. This self-cleaning arrangement aided by the introduction of any hot water reduces the frequency for manually cleaning of the grease removal system 10. Furthermore, this system is capable of effectively removing grease from the effluent to a level of 100 ppm or less of grease.

The embodiment of the subject invention just disclosed is directed to a grease removal system 10 which does not require parts, such as automatic valves, heating probes, and electronic level sensors that can accumulate a build-up of grease and function improperly. The self-cleaning arrangement of the present invention reduces this excessive build-up of grease. Therefore, the present invention reduces the likelihood of the grease removal system 10 malfunctioning due to improper cleaning and maintenance.

While what has been discussed so far is a grease removal system that utilizes re-circulation and a secondary tank containing bacterial enzymes to break down the grease, it is also possible to direct grease from the discharge portal of the grease trap tank into a replaceable container such that the grease may be transported and disposed of in an environmentally proper fashion.

Figure 5:
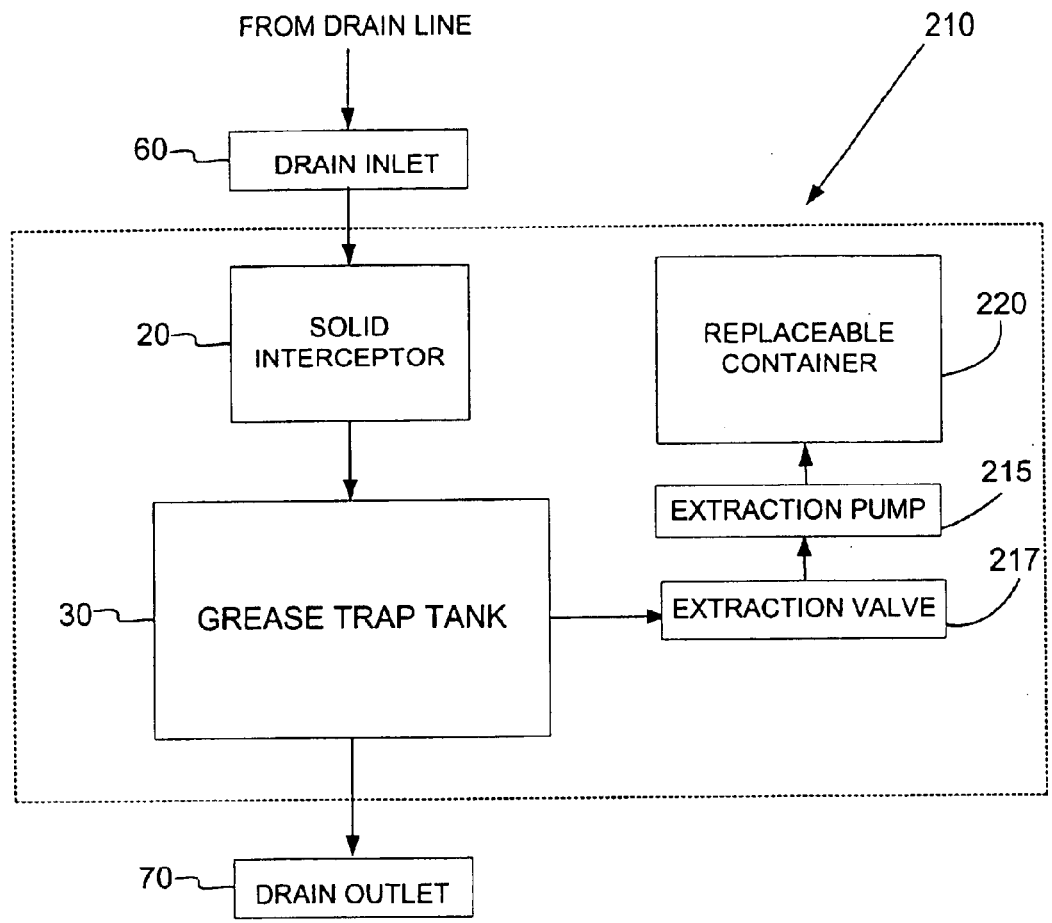
FIG. 5 is a block diagram of a second embodiment of the grease removal system made in accordance with the subject invention.
Figure 6:
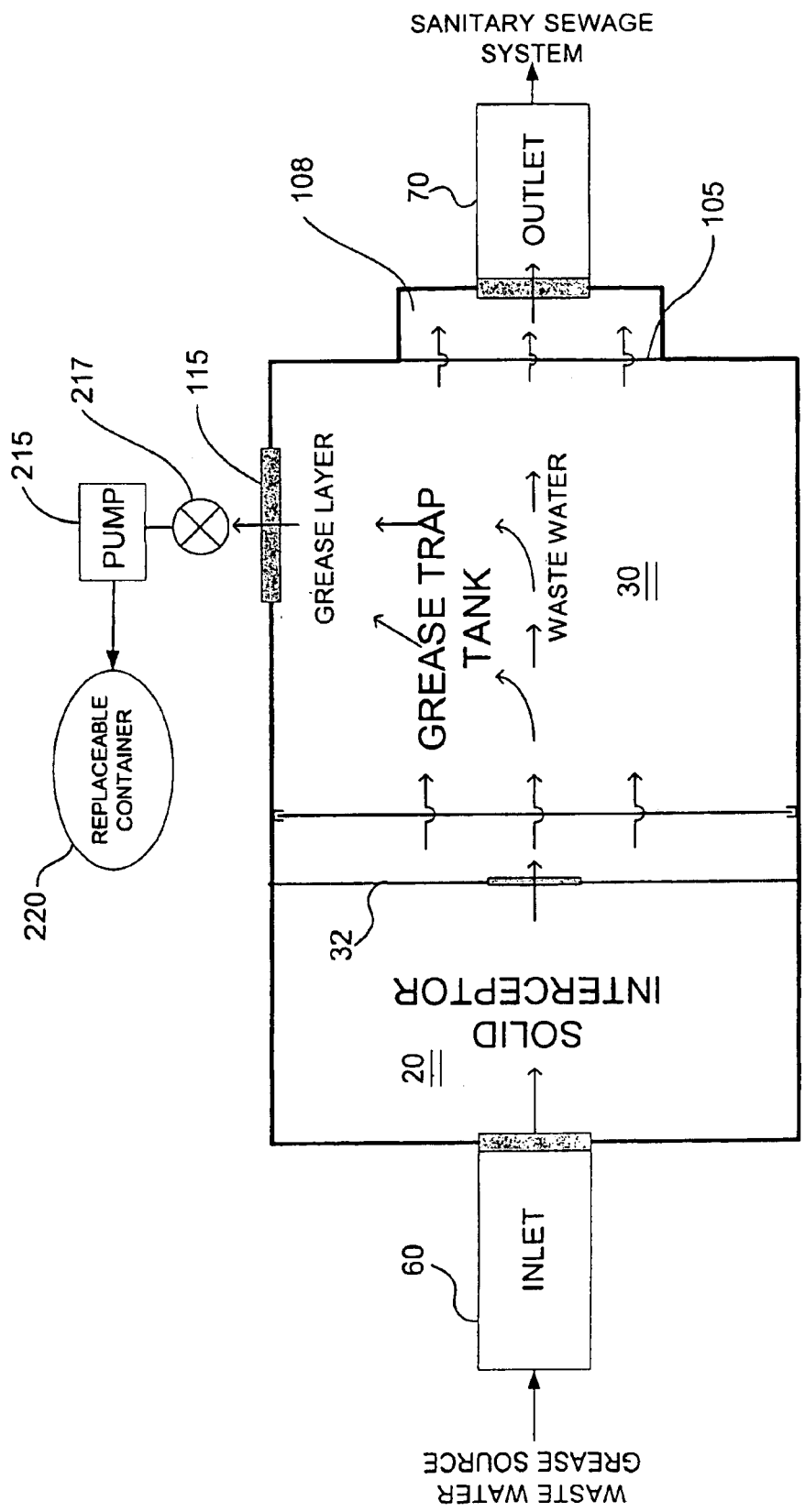
FIG. 6 is a schematic of the grease trap design shown in FIG. 5 depicting the flow of the grease trap wastewater.
Figure 7:
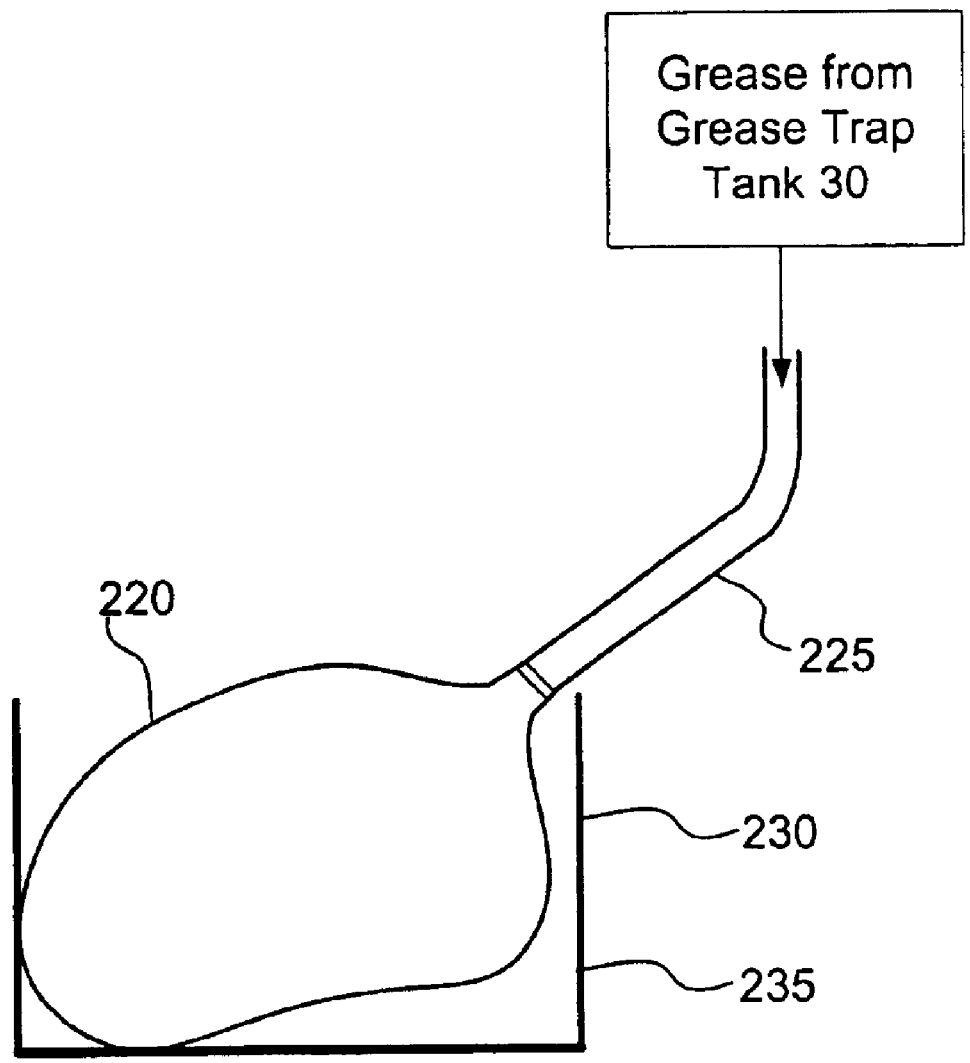
FIG. 7 shows a grease collection bag fluidly connected to the grease trap tank shown in FIG. 6 for collecting grease.

Directing attention to FIGS. 5–7 and utilizing reference numbers that are common to the elements in the first embodiment discussed with respect to FIGS. 1–4, a grease removal system 210 includes a solid interceptor 20, a grease trap tank 30, an optional extraction pump 215, an extraction valve 217 and a replaceable container 220, such as a grease bag. Just as before, the drain inlet 60 is fluidly coupled to the solid interceptor 20 for allowing wastewater to enter into the solid interceptor 20, wherein the solid interceptor may include a screen or bag filter for trapping particles above a certain size. The wastewater from the solid interceptor 20 enters the grease trap tank 30, whereupon the grease is separated from the wastewater. The grease trap tank 30 functions once again as a hold-up tank wherein gravity is used to separate the grease from the water. Because the grease has a lower specific gravity than water, grease floats to the surface of the grease trap tank 30 thus forming a grease layer. The water under the grease layer flows out the drain outlet 70 and the grease layer accumulates in the grease trap tank 30 until a layer of grease accumulates to a predetermined level. The discharge portal 115 is connected to the extraction valve 217 such that the predetermined level of grease within the grease trap tank 30, the extraction valve 217 is opened to transfer the grease through the discharge portal 115 and into the replaceable container 220. The extraction pump 215 may be included to assist with the transfer of grease to the replaceable container 220. However, in a preferred embodiment, the extraction pump 215 is not present and the grease travels directly through the extraction valve 217 to the replaceable container 220.

The details of the solid interceptor 20 and the grease trap tank 30 may be identical to those previously disclosed with respect to FIGS. 1–3 with the exception that now the secondary tank 40 and the associated pump 50 are absent because the present embodiment does not provide any re-circulation of wastewater or exposure of grease to bacterial enzymes but deposits the grease directly in the replaceable container 220 for removal.

The extraction valve 217 may be a solenoid operated valve which may act as a control valve to start and stop the flow of grease through the discharge portal 115. Directing attention to FIGS. 6 and 7, grease flowing from the discharge portal 115 through the extraction valve 217 may travel through a conduit 225 into the replaceable container 220. The replaceable container is in an enclosure 230. The enclosure 230 may be placed on a scale 235 which includes a scale sensor (not shown) used to determine whether or not the replaceable container 220 is full. The conduit 225 may also include a stopper or check valve (not shown), wherein the residual grease in the conduit 225 ceases to flow when the container 220 is being changed out. Additionally, in the event the replaceable container 220 becomes full, the valve 217 will be closed such that no additional grease may be directed to the replaceable container 220.

Effluent traveling under the outlet grease baffle 105 may still contain residual grease which may be retained in the clean out portion 108 of the grease trap tank 30 and may be removed through an access port (not shown).

Figure 8:
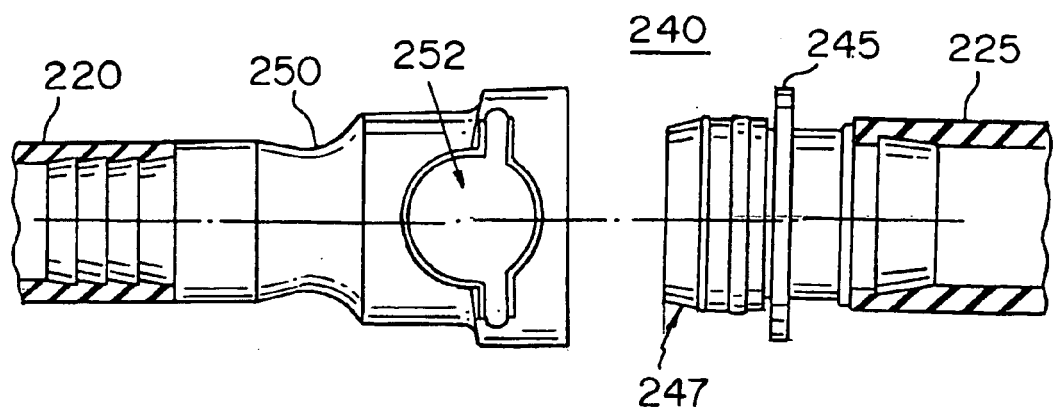
FIG. 8 is a side view of a quick connect coupling used to connect the grease collection bag to the grease trap tank system.
Figure 12:
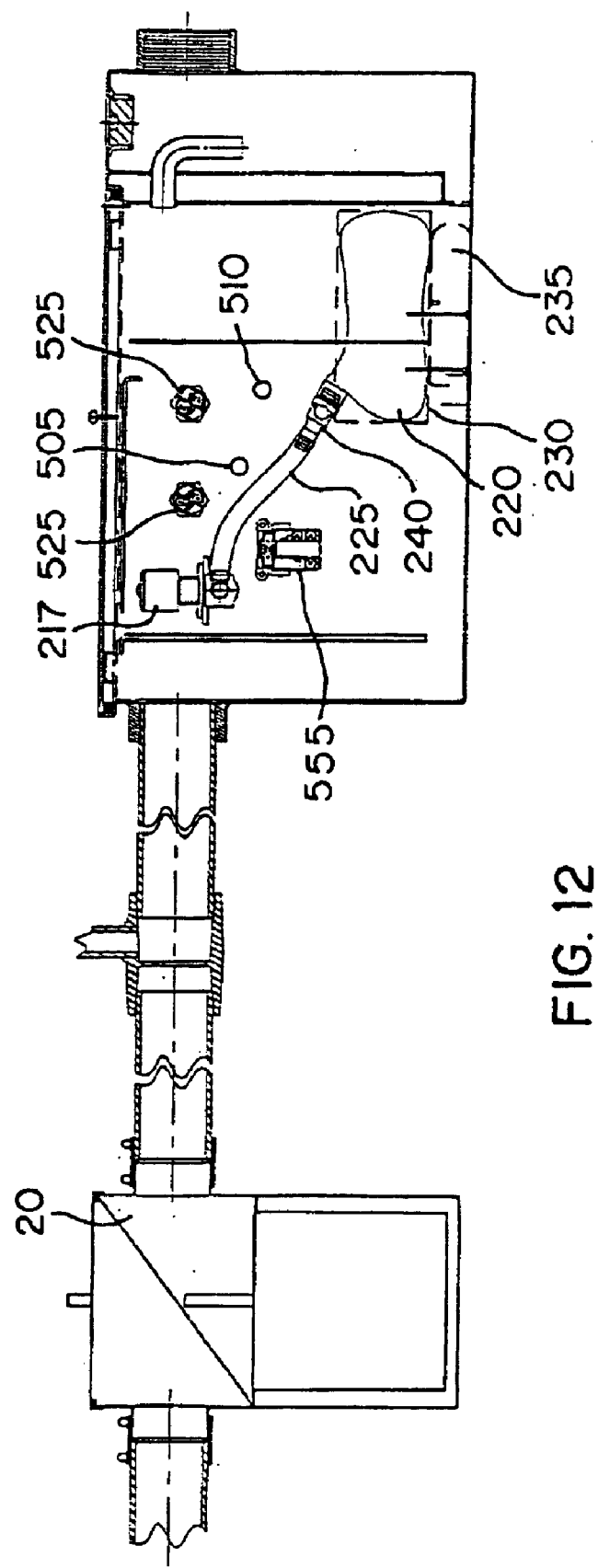
FIG. 12 is an elevational view of a commercial embodiment of the grease removal system in accordance with the subject invention.

Directing attention to FIGS. 8 and 12, the conduit 225 extending between the pump 215 and the replaceable container 220 may be connected to the replaceable container 220 by a quick connect coupling 240.

A typical quick connect coupling 240 (FIG. 8) may be comprised of a male member 245 connected to the conduit 225, wherein the male member 245 has a snap connection portion 247. The quick connect coupling 240 also has a female member 250 connected to the replaceable container 220, wherein the female member 250 includes a release button 252 which releases an engaging element within the female member 250. This quick connect coupling 240 enhances the efficiency of the grease removal system 210 by making disposal of a filled replaceable container 220 and installation of a fresh replaceable container a much simpler process.

While the embodiments of the grease trap tank 30 so far disclosed discuss only a single grease baffle 105, the path the wastewater takes through the grease trap tank 30 may be manipulated to enhance the ability of the grease trap tank 30 to remove grease from the wastewater.

Identical elements from previously disclosed embodiments will be referred to using identical reference numbers. For purposes of discussion, the grease trap tank 430 illustrated in FIG. 9 will be described as including a primary settling region 265 and a secondary settling region 270 separated by an intermediate grease baffle 275 extending from the top of the grease trap tank 430 downwardly to a distance W from the bottom 434 of the grease trap tank 430. It should be noted, however, that FIG. 9 does not show the solids interceptor 20 but shows the drain inlet 60 attached directly to the grease trap tank 430. Although not shown, the design illustrated in FIG. 9 may include such a solids interceptor 20. The intermediate grease baffle 275 and the first solids baffle 107 in conjunction with the outlet grease baffle 105 cause the wastewater to move in a torturous path, thereby preferably retaining the majority of the grease-laden water in the primary settling region 265 and retaining still additional grease-laden water in the secondary settling region 270. A second solids baffle 280 contributes to the tortuous path and to maximizing the efficiency of grease separation within the primary settling region 265 and the secondary settling region 270. Each of the solids baffles 107 and 280 extends upwardly from the bottom 434 of the tank 430 and is located adjacent to the intermediate grease baffle 275 to provide a channel 285 with a torturous path between the inlet 60 and the outlet 70.

Figure 9:
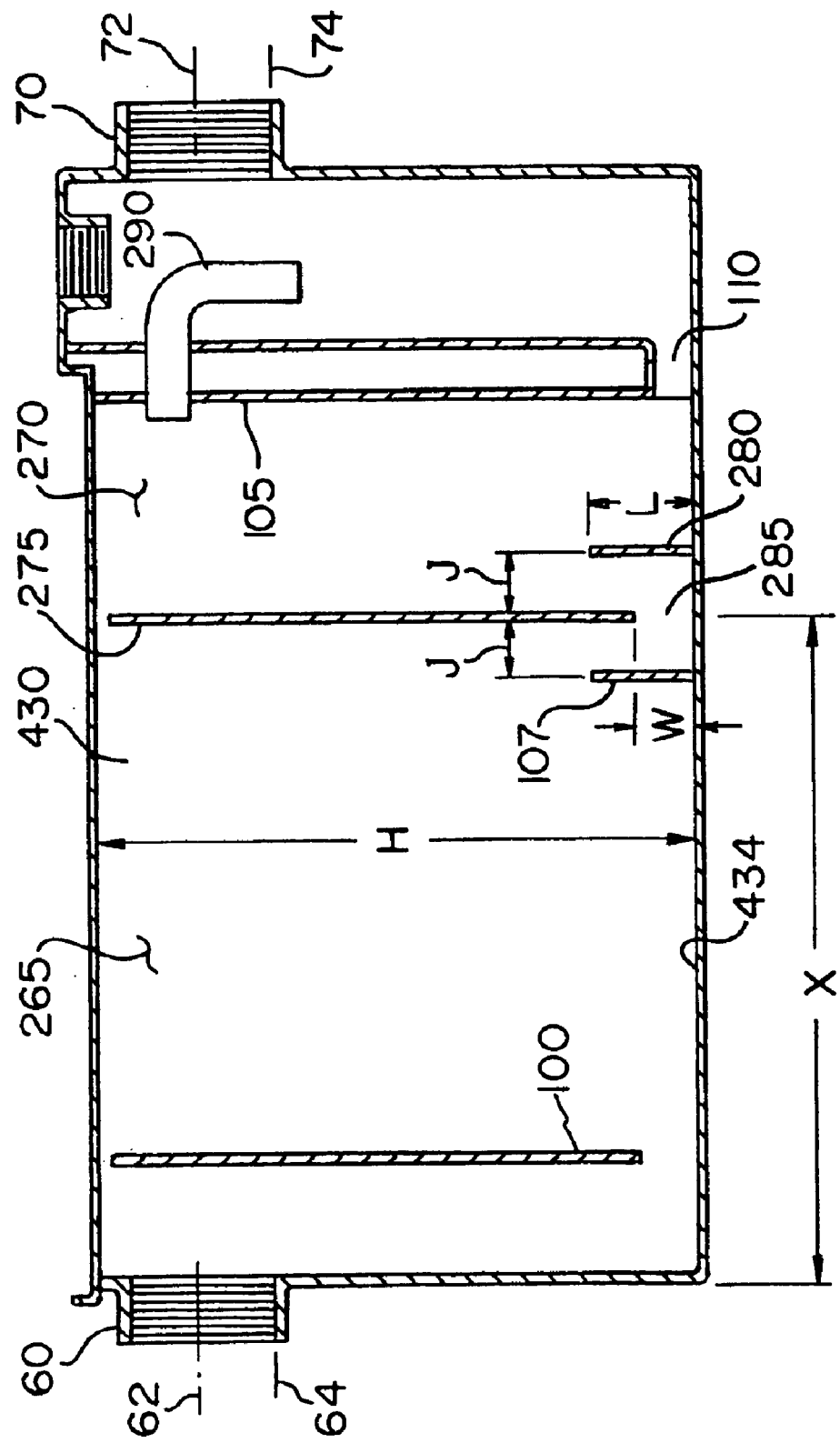
FIG. 9 is an elevational view of a grease removal system in accordance with a third embodiment of the subject invention.

As illustrated in FIG. 9, there is one solids baffle spaced on each side of the intermediate grease baffle 275. In particular, first solids baffle 107 is placed upstream and second solids baffle 280 is placed downstream of the intermediate grease baffle 275. In one embodiment, each of the two solid baffles 107, 280 is equally spaced on opposite sides of the intermediate grease baffle 275. Additionally, the height L of each of the solids baffles 107, 280 may be equal. The intermediate grease baffle 275 may be spaced from the side of the grease trap tank 430 closest to the drain inlet 60 by a distance X equal to between one-half and three-quarters the length of the grease trap tank 430. Additionally, the channel 285 formed by the at least one solids baffle 107 and the intermediate grease baffle 275 has a cross-sectional area that is approximately equal throughout the channel 285 as it extends past the first solids baffle 107, second grease baffle 275 and second solid baffle 280. Furthermore, the height of the channel 285 at the bottom of the intermediate grease baffle 275 may be approximately between one-twentieth to one-quarter of the height H of the grease trap tank 430. The solids baffles 107, 280 have a height L less than one-quarter of the height H of the grease tank trap 430. In one embodiment, the channel 285 at the bottom 434 of the intermediate grease baffle 275 has a height T which is the same height as the height L of each of the solids baffles 107, 280.

In operation, grease-laden water passes through the drain inlet 60 and is directed downward by entrance baffle 100. First solids baffle 107, second grease baffle 275 and second solids baffle 280 cause the water to move in a tortuous path thereby preferably retaining a majority of the grease-laden water within the primary settling region 265. Wastewater continues past the intermediate grease baffle 275 into the secondary settling region 270 wherein additional grease is retained. Water continues through passageway 110 where it travels upward and is discharged through the drain outlet 70.

Effluent traveling through passageway 110 may still contain residual grease which may be retained in the clean out portion 108 of the grease trap tank 30. A threaded access port 109, sealed with a plug (not shown) provides access to the clean out portion 108 for removing any grease that may accumulate therein.

In the event of pressure build up within the tank 30, an air relief passage 290 acts to relieve such pressure.

Figure 10:
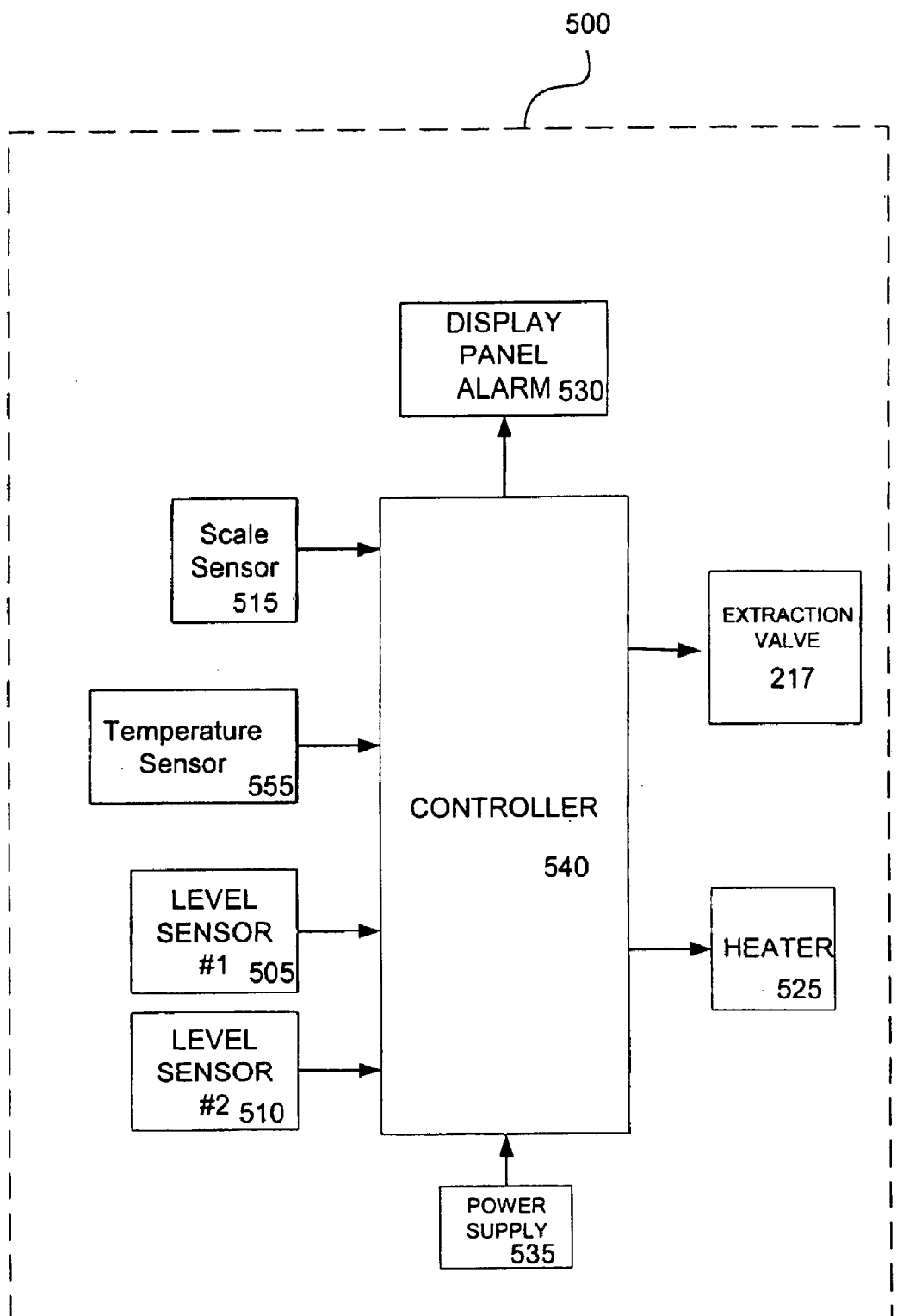
FIG. 10 is a block diagram showing a control scheme of the grease removal system illustrated in FIG. 9.
Figure 11:
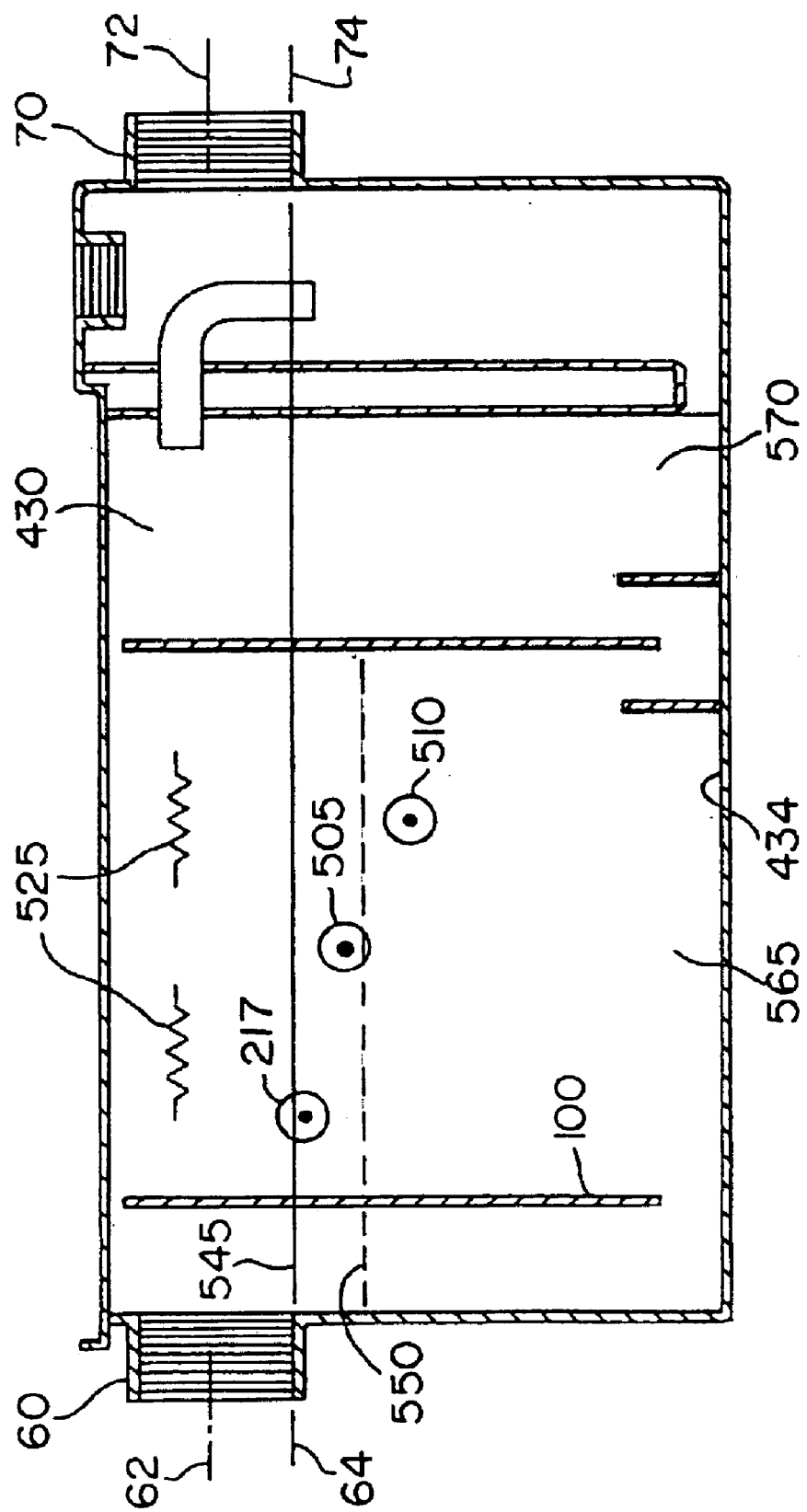
FIG. 11 is an elevational view of a grease removal system having a unique arrangement of baffles.

FIG. 10 shows a control scheme 500 for automatically removing grease from the grease trap tank 430 illustrated in FIG. 11 and these two Figures will be discussed together. The control scheme 500 includes a first level sensor 505, a second level sensor 510, a scale sensor 515, an extraction valve 217, heaters 525, a display panel alarm 530, a power supply 535 and a controller 540. Power from the power supply 535 energizes the components of the control scheme 500. In particular, when grease begins to accumulate on the surface of the grease-laden water, the first level sensor 505 is activated when no water (only grease) is present at the level of the first level sensor 505. At this point, as illustrated in FIG. 11 by level 545, the first level sensor 505 and the second level sensor 510 are completely covered by water.

The first level sensor 505 and the second level sensor 510 may be capacitive sensors. This type of sensor has been found to be more sensitive than other sensors, such as optical sensors, at detecting the presence of water and grease. Whatever sensors are used, they will be coated with grease during usage and the capacitive sensors operate more effectively to detect water and grease even in this coated condition.

Generally speaking, a capacitive sensor operates by forming an electrostatic field between an active electrode on the sensor and a ground. Any object entering the field will increase the capacitance. Different objects create more or less capacitance. When the increase in capacitance is large enough, an oscillation is set up which is detected by an evaluation circuit, which then changes the state of an output circuit.

As the grease removal system 430 continues to operate and grease-laden water continues to enter through drain inlet 60, grease builds down from the top and displaces the water such that, as illustrated by water level 550, the first level sensor 505 is no longer covered by water but is covered by a layer of grease. Each of the first level sensor 505 and the second level sensor 510 is capable of distinguishing between water and grease and, therefore, as a result, at the point the first level sensor 505 no longer senses water, the controller 540 causes the extraction valve 217 to open, thus allowing grease to flow through the extraction valve 217 and, as illustrated in FIG. 12, through the conduit 225 into the replaceable container 220. The replaceable container 220 is a bag-like container which may be made of polyethylene and nylon. When the first level sensor 505 no longer senses grease, the controller 540 causes the extraction valve 217 to close, thus stopping the flow of grease through the extraction valve 217 and the conduit 225. The first level sensor 505 may be positioned at a height of about 90–100% of the height between the bottom 434 of the tank 430 and the lower end 64 of the inlet 60. The second level sensor 510 may be positioned at a height of about 60–80% of the height between the bottom 434 of the tank 430 and the lower end 64 of the inlet 60.

Each time the extraction valve 217 is open, additional grease is deposited within the replaceable container 220. When the scale sensor 515 senses that the replaceable container 220 is full-based upon the weight of the grease-laden container 220, the scale sensor 515 activates the controller 540 causing the extraction valve 217 to close. As an example, when the weight of the grease-laden replaceable container reaches 20 pounds, the sensor 515 activates the controller 540 to close the extraction valve 217. However, grease-laden water may continue to flow within the drain inlet 60 and water may continue to flow from the drain outlet 70. However, for so long as the replaceable container 220 is full, the extraction valve 217 will remain closed. Nevertheless, because the grease trap tank system continues to operate, grease will continue to accumulate within the grease trap tank 430. Activation of the scale sensor 515 also causes the controller 540 to activate the display panel alarm 530 indicating that the replaceable container 220 is full. When the replaceable container 220 is emptied or replaced with an empty container, the display panel alarm 530 is reset (i.e., by pressing a button), and the scale sensor 515 deactivates allowing the extraction valve 217 to open at the appropriate time. However, in the event the extraction valve 217 does not open at the appropriate time to drain grease from the grease trap tank 430, whether because the system is malfunctioning or because the replaceable container 220 is full and the extraction valve 217 is instructed not to open, if the grease continues to build down to the level of the second level sensor 510, then the second level sensor 510 activates causing the controller 540 to activate the alarm 530 indicating that an overload has occurred. The second level sensor 510 can also activate the extraction valve 217 causing the extraction valve 217 to open if the replaceable container 220 is not full as indicated by the scale sensor 515. Additionally, since grease is much easier to handle in the liquid state, a temperature sensor 555 may monitor the temperature of the effluent within the grease trap tank 430 and may regulate the water/grease temperature through the heater 525 in the grease trap tank 430. Preferably, the heaters 525 may maintain the temperature of the water/grease between 115–135° F., preferably about 125° F.

Also illustrated in FIG. 12 are the extraction valve 217, the heaters 525 and the temperature sensor 555.

Directing attention to FIG. 11, it should be appreciated that the level of the water in the primary settling region 565 will be different than the level of the water in the secondary settling region 570 when there is an accumulation of grease in the primary settling region 565.

Briefly stated, if there is a substantial accumulation of grease within the primary settling region 565, then the level of the water in the primary settling region 565 will be depressed. On the other hand, the secondary settling region 570 may have some grease but a substantially smaller amount of grease than that found in the primary settling region 565. The layer of grease floating upon the water within the primary settling region 565 will push that level of water down while the water within the secondary settling region 570, since it has no or a substantially less amount of grease floating upon its surface, will be raised. This featurv is beneficial because at the time the extraction valve 217 is open, grease will flow out of the valve until the first level sensor 505 is submerged in water. As the grease exits the extraction valve 217, the water in the secondary settling region 570 will seek equilibrium with the water in the primary settling region 565 and, as a result, the column of water within the primary settling region 565 will actually be pushed upwardly, thereby ensuring that the grease is forced at least as high as the extraction valve 217 at the end of the draw-off cycle, to permit the grease to more effectively discharge from the grease trap tank 430, and reset the extraction valve 217 and the sensors to the initial state.

FIG. 12 is an elevational view of a commercial embodiment of the grease removal system illustrated in FIG. 11 and shown schematically in FIG. 6. The solid interceptor 20 has a screen or bag filter therein (not shown) to trap solids above a certain size. The wastewater leaves the solid interceptor 20 and travels to the grease removal system 30 where it is further processed. The operation of the first level sensor 505 and the second level sensor 510 has been discussed in conjunction with FIG. 11. As previously discussed, grease is removed from the surface of the wastewater by the extraction pump 215. The grease is then directed through the conduit 225, past the quick connect coupling 240 and into the replaceable container 220. When the weight of the replaceable container 220 filled with grease reaches a certain threshold, the replaceable container 220 is replaced. The replaceable container 220 rests within enclosure 230, which itself rests upon a scale 235.

Although the embodiment described in FIGS. 10–12 discharges grease through the extraction valve 217 and into a conduit 225, wherein it is deposited into a replaceable container 220, it is entirely possible for the extraction valve 217 to deposit the grease into a secondary tank 40 such as that illustrated in FIGS. 1 and 2, whereby the grease is then decomposed by an enzyme solution resident within the secondary tank 40.

In an illustrative example, the grease trap tank may have a capacity to hold 30 gallons of grease/water. The flow rate through the grease trap tank could be 15 gallons per minute and the sensor scale could detect a full replaceable container of approximately 20 pounds, while the grease tank retains its maximum capacity of 30 pounds of grease.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A grease removal system comprising:
   a) a grease trap tank having outer walls and a bottom connected to the outer walls;
   b) an inlet through an outer wall of the grease trap tank, wherein the inlet has a center and a lower end;
   c) an outlet through an outer wall of the grease trap tank, wherein the outlet has a center and a lower end;

d) an outlet grease baffle positioned between the inlet and the outlet extending downwardly across the tank to an elevation spaced from the tank bottom defining a passageway therethrough to permit effluent having a specific gravity greater than grease to pass but to retain and accumulate grease on the surface of the effluent within the grease trap tank, wherein the outlet grease baffle defines a grease chamber within the tank between the inlet and the outlet grease baffle; and e) a discharge portal having a center and a lower end providing access through the grease trap tank outer wall in the grease chamber to the outside of the grease trap tank, wherein the lower end of the discharge portal is located to permit removal by gravity of liquid grease from the surface of the effluent passing through the grease trap.

2. The system according to claim 1, further including an entrance baffle positioned proximate to the inlet to the grease trap tank to direct fluid entering the grease trap tank toward the bottom of the tank.

3. The system according to claim 1, further including a screen filter between the inlet and the grease trap tank to remove solids.

4. The system according to claim 1, further including at least one heater to heat the effluent and retain the grease in a liquid state.

5. The system according to claim 1, further including a replaceable container adjacent to the grease trap tank, wherein the discharge portal directs grease into the replaceable container.

6. The system according to claim 5, wherein the discharge portal is connected to a valve such that at a predetermined grease level the valve may be opened to permit the grease to flow into the replaceable container.

7. The system according to claim 6, further including a scale supporting the replaceable container and a sensor such that when the weight of the grease bag meets or exceeds a certain value, the valve is closed.

8. The system according to claim 6, further including a quick connect coupling between the discharge portal and the replaceable container to promote ease in connecting and disconnecting the discharge portal to the replaceable container.

9. The system according to claim 6, further including a grease trap tank pump connected to the valve to assist the flow of the grease into the replaceable container.

10. The system according to claim 1, further including a secondary tank adjacent to the grease tank, wherein the secondary tank retains an enzyme solution and wherein the discharge portal directs grease into the secondary tank such that the enzyme solution may act upon and decompose the grease therein.

11. The system according to claim 10, further including a metering pump to introduce the enzyme solution within the secondary tank in a controlled fashion.

12. The system according to claim 10, wherein the discharge portal is a spillway such that when grease accumulates on the other effluent to a sufficient thickness, the grease will proceed to pass over the spillway and into the secondary tank.

13. The system according to claim 12, further including a secondary tank pump connecting an outlet from the secondary tank to the grease trap tank inlet, such that effluent may be recirculated from the secondary tank back to the grease trap tank.

14. The system according to claim 13, wherein the secondary tank pump is positioned to draw fluid from the bottom of the secondary tank.

15. The system according to claim 10, wherein the discharge portal is connected to a valve and a grease trap tank pump such that at a predetermined level the valve may be opened and the grease trap tank pump activated to assist the flow of the grease into the secondary tank.

16. The system according to claim 15, further including a secondary tank pump connecting an outlet from the secondary tank to the grease trap tank inlet, such that effluent may be recirculated from the secondary tank back to the grease trap tank.

17. The system according to claim 16, wherein the secondary tank pump is positioned to draw fluid from the bottom of the secondary tank.

18. The system according to claim 1, further including an intermediate grease baffle between the inlet and the outlet grease baffle, wherein the intermediate grease baffle extends downwardly across the tank to an elevation spaced from the tank bottom, at least one solids baffle extending upwardly from the tank bottom and located adjacent to the intermediate grease baffle to provide a channel with a torturous path between the inlet and the outlet.

19. The system according to claim 18, wherein there is one solids baffle spaced on each side of the intermediate grease baffle.

20. The system according to claim 19, wherein each of the two solids baffles is equally spaced on opposite sides of the intermediate grease baffle, thereby providing a first solids baffle and a second solids baffle.

21. The system according to claim 20, wherein the height of each solids baffle is equal.

22. The system according to claim 18, wherein the intermediate grease baffle is spaced from the inlet side of the grease trap tank by a distance equal to between ½–¾ length of the grease trap tank.

23. The system according to claim 18, wherein the channel formed by the at least one solids baffle and the intermediate grease baffle has a cross-sectional area that is approximately equal throughout the channel.

24. The system according to claim 23, wherein the intermediate grease baffle channel height is approximately between ¹⁄₂₀ and ¼ of the height of the grease trap tank.

25. The system according to claim 23, wherein the at least one solids baffle has a height of less than ¼ the height of the grease trap tank.

26. The system according to claim 23, wherein the grease baffle channel at the bottom of the intermediate grease baffle has the same height as the height of the at least one solids baffle.

27. A method of removing grease from an effluent comprising the steps of:
    a) providing:
        1) a grease trap tank having outer walls and a bottom connected to the outer walls;
        2) an inlet through an outer wall of the grease trap tank, wherein the inlet has a center and a lower end; and
        3) an outlet through an outer wall of the grease trap tank wherein the outlet has a center and a lower end;
    b) introducing effluent laden with grease into the grease trap;
    c) separating a substantial portion of the grease from the effluent by allowing the grease to float upon the other effluent; and
    d) discharging grease that rests upon and above the other effluent by allowing the grease at a certain level to flow by gravity from the tank and directing the discharged grease through a discharge portal and out of the grease trap tank.

28. The method according to claim 27, wherein the step of directing the discharged grease through a discharge portal involves the step of directing the discharged grease into a replaceable container adjacent to the grease trap tank.

29. The method according to claim 28, wherein the steps of discharging grease that rests upon and above the other effluents and directing the discharged grease through a portal is accomplished by opening a valve to allow grease to flow through the discharge portal.

30. The method according to claim 27, wherein the step of directing the discharged grease through a discharge portal involves the step of directing the discharged grease into a secondary tank adjacent to the grease trap tank, wherein the secondary tank retains an enzyme solution that acts upon and decomposes the grease therein.

31. The method according to claim 30, wherein the enzyme solution is metered into the secondary tank.

32. The method according to claim 30, wherein the discharge portal is a spillway and the step of discharging grease that rests upon and above the other effluent by allowing it to flow from the tank at a certain level is accomplished by allowing the grease to accumulate and flow over the spillway and into the secondary tank.

33. The method according to claim 30, wherein the steps of discharging grease that rests upon and above the other effluent and directing the discharged grease through a portal is accomplished by opening a valve to allow grease to enter the discharge portal and to flow into the secondary tank having the enzyme solution therein.

34. The method according to claim 33, further including the step of heating the effluent within the grease trap tank to retain the grease in a liquid state.

35. A grease removal system for removing grease from a grease trap tank comprising:
   a) a grease trap tank wherein grease is accumulated upon the surface of other effluent within the tank;
   b) a discharge portal extending from the grease trap tank at a certain level on the tank to extract the accumulated grease;
   c) a replaceable container for collecting the grease extracted from the grease trap tank, wherein the replaceable container has an inlet; and
   d) a coupling between the discharge portal and the replaceable container inlet for ease in removal or installation of the discharge portal with the replaceable container.

36. The grease removal system according to claim 35, wherein the coupling is a quick connect coupling having a spring-loaded female portion that is matable with an indent in a male portion, wherein the spring engages the indent to secure the portions together.

37. A grease removal system comprising:
   a) a grease trap tank having outer walls and a bottom connected to the outer walls;
   b) an inlet through an outer wall of the grease trap tank, wherein the inlet has a center and a lower end;
   c) an outlet through an outer wall of the grease trap tank, wherein the outlet has a center and a lower end;
   d) an outlet grease baffle positioned between the inlet and the outlet extending downwardly across the tank to an elevation spaced from the tank bottom to permit effluent having a specific gravity greater than grease to pass but to retain and accumulate grease on the surface of the other effluent within the grease trap tank, wherein the grease baffle defines a grease chamber within the tank between the inlet and the grease baffle;
   e) a discharge portal having a center and a lower end providing access through the grease trap tank outer wall in the grease chamber to the outside of the grease trap, wherein the lower end of the discharge portal is located to permit removal by gravity of liquid grease from the surface of the effluent passing through the grease trap, wherein the discharge portal has a valve therein; and
   f) a first level sensor positioned below access to the discharge portal, wherein the first level sensor is capable of sensing a layer of grease upon the effluent, such that when such a layer is detected, the valve in the discharge portal is opened and grease is removed by gravity from the grease trap tank until the first level sensor no longer detects a layer of grease.

38. The system according to claim 37, wherein the first level sensor is a capacitive sensor.

39. The system according to claim 37, wherein the first level sensor is an optical sensor.

40. The system according to claim 37, further including a grease trap tank pump associated with the discharge portal and activated at the same time the valve is opened to assist the flow of grease from the grease trap tank.

41. The system according to claim 37, further including a replaceable container attached to the discharge portal wherein grease removed through the discharge portal is deposited within the replaceable container.

42. The system according to claim 41, further including a scale associated with the replaceable container, wherein when the replaceable container reaches a predetermined weight, the valve closes and no more grease is able to pass through the discharge portal.

43. The system according to claim 37, wherein the first level sensor is positioned at a height of between about 90–100% of the height between the bottom of the tank and the lower end of the inlet.

44. The system according to claim 37, further including a second level sensor positioned below the first level sensor, wherein the second level sensor is capable of sensing a layer of grease upon the effluent, such that when such a layer is detected, an alarm mode is initiated.

45. The system according to claim 44, wherein the second level sensor is positioned at a height of about between 60–80% of the height between the bottom of the tank and the lower end of the inlet.

46. The system according to claim 44, wherein at least one of the first and second level sensors is a capacitive sensor.

47. The system according to claim 37, further including heaters proximate to the effluent in the grease trap tank to maintain the grease in a liquid state.

48. A method of removing grease from an effluent comprising the steps of:
   a) providing:
      1) a grease trap tank having outer walls and a bottom connected to the outer walls;
      2) an inlet through an outer wall of the grease trap tank, wherein the inlet has a center and a lower end;
      3) an outlet through an outer wall of the grease trap tank, wherein the outlet has a center and a lower end; and
      4) a discharge portal having a center and a lower end providing access through the grease trap outer wall, wherein the lower end of the discharge portal is located to permit removal by gravity of liquid grease from the surface of the effluent passing through the grease trap;
   b) introducing effluent laden with grease into the grease trap;

c) separating a substantial portion of the grease from the other effluent by allowing the grease to float upon the other effluent;

d) allowing the grease to accumulate to a predetermined thickness thereby weighing upon the other effluent in the grease trap tank and depressing the level of the other effluent within the tank; and e) when the grease layer reaches a predetermined level, opening a valve to discharge the grease by gravity through the discharge portal until the grease is removed to below a predetermined level.

49. The method according to claim 48, further including a first level sensor below the level of the lower end of the discharge portal and opening the valve when the grease activates the first sensor.

50. The method according to claim 49, wherein the step of discharging the grease includes discharging the grease into a replaceable container.

51. The method according to claim 50, further including the step of monitoring the level to which the replaceable container is filled and closing the valve when the replaceable container has filled up to or beyond that predetermined level.

52. The method according to claim 51, further including a second level sensor below the level of the first level sensor and the step of sensing the level of the grease when the valve is closed and when the grease accumulates to activate the second level sensor, activating an alarm.

53. The method according to claim 49, wherein when the grease is removed from the grease trap tank, the level of other effluent rises to the first level sensor and the valve is closed.

54. A grease removal system comprising:

a) a grease trap tank having outer walls and a bottom connected to the outer walls;

b) an inlet through an outer wall of the grease trap tank, wherein the inlet has a center and a lower end;

c) an outlet through an outer wall of the grease trap tank, wherein the outlet has a center and a lower end;

d) an outlet grease baffle positioned between the inlet and the outlet extending downwardly across the tank to an elevation spaced from the tank bottom defining a passageway therethrough to permit effluent having a specific gravity greater than grease to pass but to retain and accumulate grease on the surface of the effluent within the grease trap tank, wherein the outlet grease baffle defines a grease chamber within the tank between the inlet and the outlet grease baffle;

e) a discharge portal having a center and a lower end providing access through the grease trap tank outer wall in the grease chamber to the outside of the grease trap tank, wherein the lower end of the discharge portal permits removal by gravity of liquid grease from the surface of the effluent passing through the grease trap;

f) a replaceable container adjacent to the grease trap tank, wherein the discharge portal extends into and directs grease into the replaceable container; wherein the discharge portal is connected to a valve such that at a predetermined level the valve may be opened to transfer the grease into the replaceable container; and g) a scale supporting the replaceable container and a sensor such that when the weight of the grease bag meets or exceeds a certain value, the valve is closed.

55. A grease removal system comprising:

a) a grease trap tank having outer walls and a bottom connected to the outer walls;

b) an inlet through an outer wall of the grease trap tank, wherein the inlet has a center and a lower end;

c) an outlet through an outer wall of the grease trap tank, wherein the outlet has a center and a lower end;

d) an outlet grease baffle positioned between the inlet and the outlet extending downwardly across the tank to an elevation spaced from the tank bottom defining a passageway therethrough to permit effluent having a specific gravity greater than grease to pass but to retain and accumulate grease on the surface of the effluent within the grease trap tank, wherein the outlet grease baffle defines a grease chamber within the tank between the inlet and the outlet grease baffle;

e) a discharge portal having a center and a lower end providing access through the grease trap tank outer wall in the grease chamber to the outside of the grease trap tank, wherein the lower end of the discharge portal permits removal by gravity of liquid grease from the surface of the effluent passing through the grease trap;

f) a replaceable container adjacent to the grease trap tank, wherein the discharge portal extends into and directs grease into the replaceable container; wherein the discharge portal is connected to a valve such that at a predetermined level the valve may be opened to transfer the grease into the replaceable container; and g) a quick connect coupling between the discharge portal and the replaceable container to promote ease in connecting and disconnecting the discharge portal to the replaceable container.

* * * * *